March 18, 1947. J. B. POLOMSKI 2,417,566
BLOCKING RING RELEASE MECHANISM
Filed Feb. 17, 1944 2 Sheets-Sheet 1
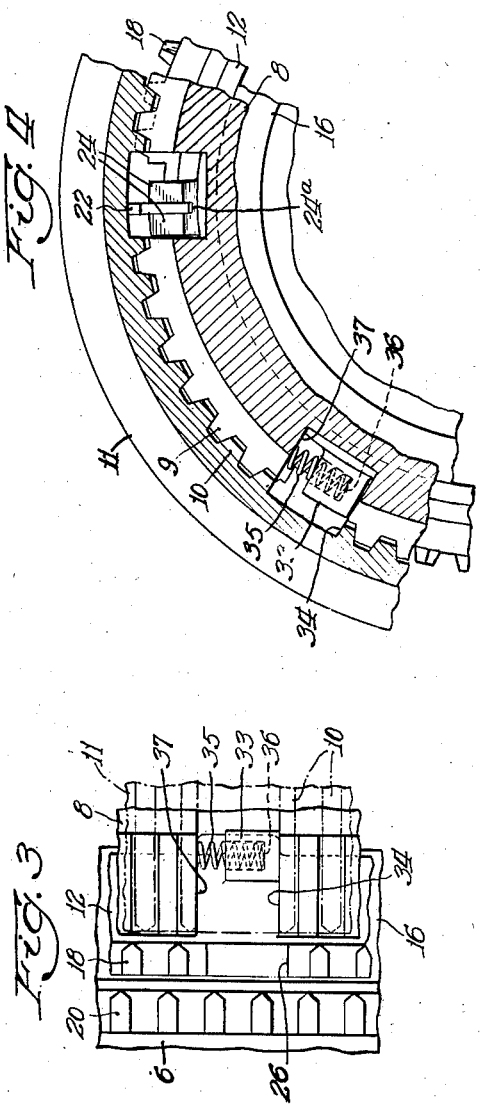
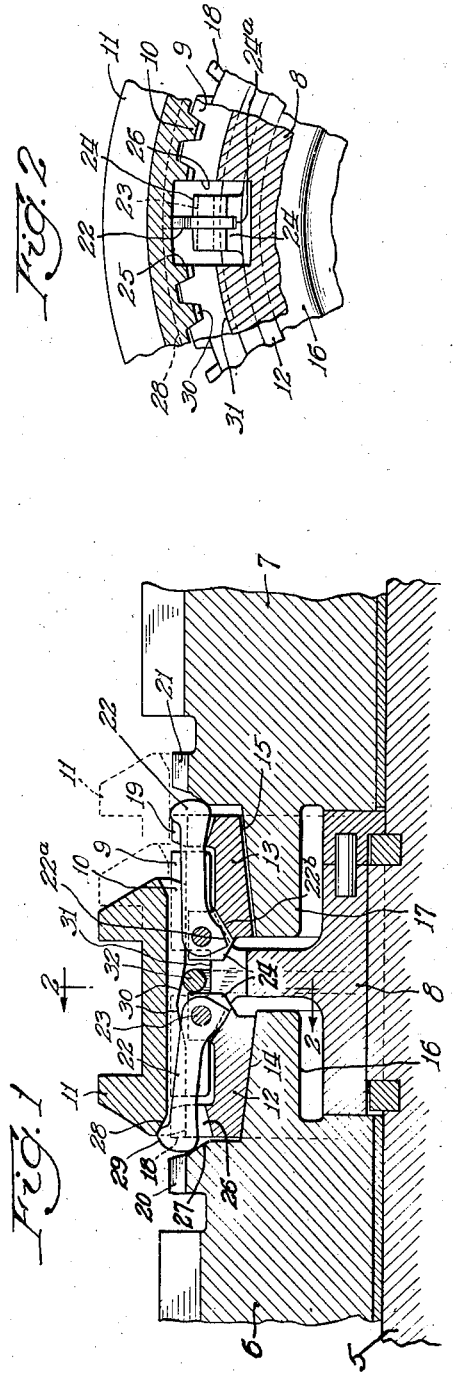
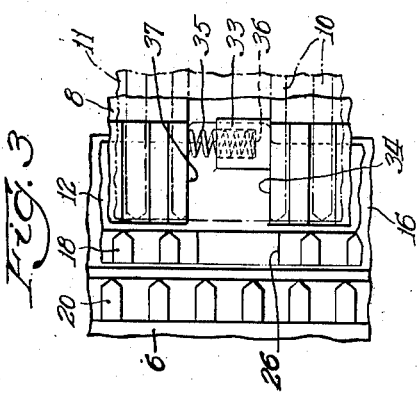
Inventor:
John B. Polomski
By: Edward C. Pritzbaugh
Atty.

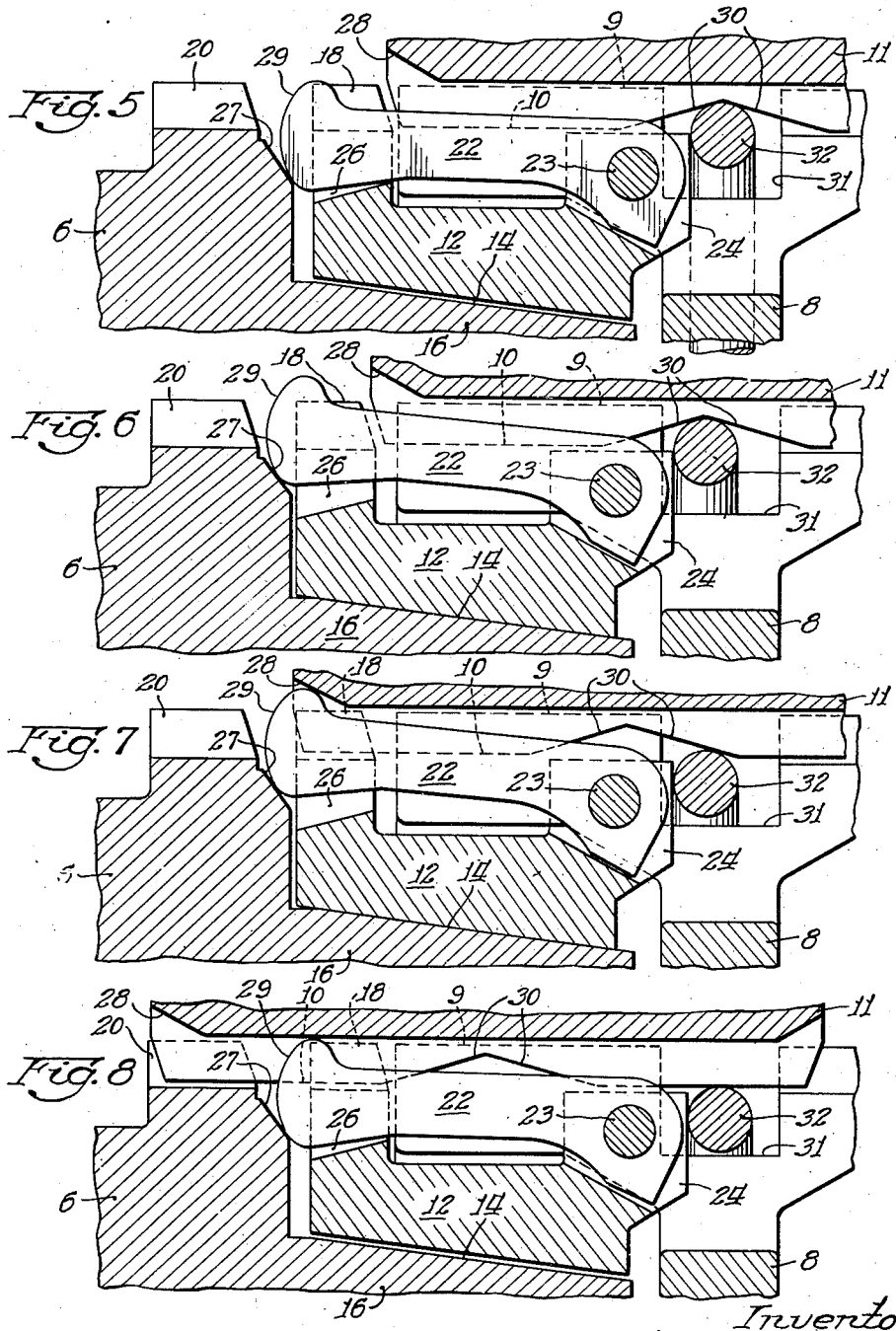

Patented Mar. 18, 1947

2,417,566

UNITED STATES PATENT OFFICE 2,417,566

BLOCKING RING RELEASE MECHANISM

John B. Polomski, Detroit, Mich., assignor to Borg-Warner Corporation, Chicago, Ill., a corporation of Illinois Application February 17, 1944, Serial No. 522,709

23 Claims. (Cl. 192—53)

The present invention relates to mechanism for releasing the blocking ring in certain types of toothed coupling devices. In this connection, a positively actuated mechanism is provided that insures the operation of the assembly in a dependable manner at all times.

In couplings of the type contemplated herein an auxiliary frictional connection is made between two movable clutching members for effecting simultaneous rotation of both members. This frictional connection usually comprises tapered faces on the respective members with means for blocking the movement of one of the members into engaged position, and when one member is bodily moved axially toward the opposing member these tapered faces will be frictionally engaged. Frequently, in such assemblies the coacting friction faces become firmly locked together, thus preventing further operation of the coupling. Attempts have heretofore been made to effect the release of the tightly clutched members by means such as yieldable or spring-actuated tension devices. These instrumentalities however have proven only partially successful, and they are by no means dependable or positive in their operation. It is the purpose of the present invention to definitely overcome the inherent condition above explained by providing in a transmission assembly certain positively operating devices that will effect the release of the frictionally engaged members at the proper time during the cycle of operation of the clutching devices and will perform this function through the instrumentalities of cam members.

It is one of the principal objects of the present invention to simplify the construction of a blocking ring release mechanism, such as contemplated herein, and to improve the efficiency, operation, and dependability of such mechanism.

Another principal object of this invention is to provide a release mechanism for a blocker ring of a transmission that is actuated by the shift collar during a portion of its reciprocatory movement while coupling two of the relatively movable parts of a transmission clutch.

It is also an object of the present invention to provide release devices for the blocker ring that are operated by means of a cam structure whereby positive pressure is applied to the blocking ring to effect the release of the frictionally engaged faces of the clutched members.

A further object hereof is to provide a release mechanism that comprises a lever or levers fulcrumed on the blocker ring and arranged to be oscillated by the shift collar and during such oscillation to be engaged with a cam or cams that cause the lever or levers to bodily move the blocker ring out of clutching engagement with its coacting member of the transmission.

Additional objects, aims, and advantages of the invention contemplated herein will be apparent to persons who are skilled in the art after the construction and operation of the blocking ring release mechanism is understood from the within description.

It is preferred to accomplish the numerous objects of this invention and to practice the same in substantially the manner hereinafter fully described and as more particularly pointed out in the appended claims, reference being made to the accompanying drawings that form a part of this specification, wherein:

Fig. 1 is a section taken longitudinally through the axis of a transmission assembly and embodying the instrumentalities of the invention contemplated herein;

Fig. 2 is a transverse section taken on the plane of line 2—2 on Fig. 1 looking in the direction of the arrows;

Fig. 3 is a top plan view of a fragmental portion of the transmission assembly adjacent the parts that are shown in Figs. 1 and 2; and Fig. 4 is a sectional view similar to Fig. 2 showing the disposition of the blocker biasing means.

Figs. 5, 6, 7 and 8 are diagrammatic views showing the sequence of operation of the blocker release mechanism during movement of the shift collar from neutral to its extreme left position.

The drawings are to be understood as being more or less of a schematic character for the purpose of disclosing a typical or preferred form of the improvements contemplated herein, and in these drawings like reference characters identify the same parts in the different views.

The assembly embodying the transmission mechanism disclosed herein comprises the load or driven shaft 5 that has gears 6 and 7 mounted loosely thereon in spaced relation to each other, said gears being adapted to rotate freely on said shaft. These gears 6 and 7 are also adapted to rotational movement at different speeds with relation to each other, and it will be understood that one of these gears may be employed for actuating the driven shaft in one direction, and the other gear may move such driven shaft in an opposite or reverse direction. In the present instance reference will be had principally to gear 6 and it will be assumed that the gear 6 performs the function of a drive member and that it is operatively connected to a prime mover such as an internal combustion engine of a motor vehicle or the like.

A synchronizer assembly of the blocker type is employed to selectively connect these gears 6 and 7 to the shaft 5, said assembly comprising the flanged hub 8 is rotatable with the load shaft 5 and is fixedly mounted thereon intermediate the spaced gears 6 and 7. There are external teeth 9 on the flange of the hub 8 that are engaged with internal teeth 10 on a shift collar 11 surrounding the hub flange. This arrangement permits said shift collar 11 to be rotated with the central hub 8, and it also allows the collar to be slid on the hub flange in directions longitudinally of the axis of the load shaft. Blocker rings 12 and 13 having tapered inner faces 14 and 15, respectively, are positioned loosely upon the coacting synchronizer members that comprise tapered hubs 16 and 17 on the respective gears 6 and 7. These blocker rings are provided with external blocker teeth 18 and 19 respectively that are adapted to be initially interposed in the path of movement of internal teeth 10 of the shift collar 11 when the latter is slid in either direction towards the respective gears 6 and 7, and which are rocked out of the path of teeth 10 when a relative reversal of torque is effected between collar 11 and gear 6. The blocking function is brought about by the usual lost motion connection between the rings and collar or hub which in the present embodiment takes the form of lugs 24 operating in recesses 25 in the hub and collar. During the cycle of operation of coupling the parts, if the shift collar is moved to the left in Fig. 1, the tapered faces 14 and 16 of blocker ring 12 and gear 6 will become frictionally engaged thereby rocking the ring into blocking position and retaining it in this position until the relative direction of torque changes, whereupon the ring is rocked out of blocking position, and thereafter continued movement of shift collar 11 toward the left will cause its teeth 10 to slide through and beyond blocker teeth 18 and then mesh with annular clutch teeth 20 on the hub of gear 6 between the teeth of the latter and its tapered hub surface 16. When the shift collar 11 is moved in the opposite direction from its central or neutral position its teeth 10 will initially engage blocker ring teeth 19, and after the tapered faces 15 and 17 have become frictionally engaged the continued movement of the shift collar to the right will mesh its teeth with the annular teeth 21 on the hub of gear 7 that are between the teeth of the latter and its tapered hub 17 in the manner shown in dotted lines in Fig. 1. In either of these extreme left or right positions of the shift collar 11 the respective gear 6 or 7 will be coupled to the shaft 5 to effect transmission of torque from the one to the other of these coupled members. The initial movement of the rings is effected by means of a resilient ring 32 hereinafter to be described.

After the synchronizing members have performed their function it is desirable that they be released so as to be in readiness to function again. It sometimes occurs that the frictional engagement between the tapered faces of the synchronizer members is so great that these faces have become firmly locked together and upon torque reversal, roll past the unblocked position to a blocking position on the other side, thus preventing engagement of the coupling. Separation of the locked members becomes a difficult matter especially in transmission assemblies wherein the release of these members is dependent upon the action of springs or other yieldable means that are not of a positive character. In the present instance, positive operating means are provided for effecting the release of the frictionally engaged synchronizer members, such means being actuated preferably by the shift collar during its sliding movement with respect to the coacting elements of the transmission.

The releasing mechanism contemplated herein comprises a plurality of levers 22 on each ring and fulcrumed at their ends on pivots 23 in lugs 24 on the rings 12 and 13, the lugs being positioned at the inner edges of said rings adjacent the junction between the flange and the connecting web of the central hub 8. These levers 22 are disposed longitudinally with respect to the axis of rotation of the coupling assembly, the ends opposite the fulcrums being disposed adjacent the respective positive clutch teeth 20 and 21 of the gears 6 and 7. The levers and their mounting lugs fit into the recesses 25 in the shift collar 11 and hub member 8, and the ends of the levers fit into aligned recesses 26 in the blocker rings 12 and 13 between certain of their respective external teeth 18 and 19.

The outer ends of the levers 22 are formed with a profile such as that shown in Fig. 1. The formed ends are adapted for engagement with cams which may comprise oblique or wedge-shaped annular surfaces 27 formed on the gears 6 and 7, said annular surfaces being adjacent the exterior clutch teeth 20 and 21 of the respective gears. Said annular cam surfaces 27 oppose the ends of the levers 22 in such a manner that when said lever ends are moved in an inward radial direction toward the axis of the assembly the cams will create pressure longitudinally of the levers 22 to forcibly move them away from the positive clutch teeth, and since the levers are anchored to the blocker rings 12 and 13, the respective ring that has been clutched will be bodily moved in a direction that will disengage the tapered clutch faces and release said blocker ring from its adjacent gear. The means that create the forces in an inward radial direction upon the operating ends of the levers 22 comprise annular cam members preferably in the form of oblique or wedge-shaped annular surfaces 28 on the under portion of the shift collar 11 adjacent the edges thereof, said annular cams 28 being adapted for engagement with laterally disposed outwardly extended lobes or enlargements 29 on the adjacent portions of the levers 22.

When the shift collar 11 has been moved from neutral position toward one of the gears, for example to the left toward gear 6 (Fig. 1) and the synchronizing members of blocker ring 12 and said gear have been frictionally engaged and rotated to the unblocking position so as to start the collar 11 through the blocker teeth 18, the cam 28 at the left side of shift collar 11 will begin to depress the end of the adjacent lever 22, thus forcing it against the opposite cam 27 on gear 6. Continued sliding movement of the collar 11 toward gear 6 will cause the cam 27 to force the lever bodily in a direction opposite to the direction of movement of the collar and such bodily movement of the lever will release the blocker ring 12 from the tapered hub surface 16 of gear 6 by moving said blocker ring in a direction opposite to the direction of movement of the shift collar. The released positions of the synchronizer clutch members and levers is illustrated at the right in Fig. 1 in full lines and the extreme position of the shift collar, after the release of a blocker ring and full engagement of the coupling is shown in dotted lines in said figure as well as the neutral position of the collar.

The cams that comprise the oblique or wedge surfaces 27 and 28 exert forces against the levers 22 in directions or planes that are transverse to each other, and the blocker ring that is frictionally clutched to its gear is bodily moved in an axial direction when being released by the operation of the levers. In this arrangement positively operating means are provided for effecting disassociation of the synchronizer and the adjacent gear member of the transmission. Conceivably, the assembly which is herein shown in connection with a coupling mechanism that includes two synchronizers of the blocker ring type may be effectively employed in an assembly wherein there is a single blocker ring and synchronizer.

When the shift collar 11 has been moved, for example to the left (Fig. 1) to activate blocker ring 12, the free or unpivoted outer ends of the inactive release levers on the blocker ring 12 will have a tendency to swing in a radial direction outward beyond the adjacent edge of the shift collar, which is due to the action of centrifugal force created by the rotation of the assembly. This tendency, however, is overcome in a definite and positive manner by providing oblique eccentric edges 22a upon the fulcrumed portions of said levers in the manner shown in Fig. 1. Each of these edges 22a is adapted to engage stop portion 22b at the inner end of the slot 24a that is between the pair of mounting lugs 24 for the respective levers.

The aforementioned blocker ring energizing means comprises oppositely extended cam faces 30 in shift collar 11 that form a flat V-shaped recess on the inside of the collar as shown in Fig. 1, and there is an annular channel 31 in the hub opposite these cam faces. A split expanding spring 32 of proper diameter is positioned in the hub channel 31, and it is so located that it will be engaged by a cam face 30 when the shift collar moves out of neutral position. The movement of the shift collar 11 forces the ring into engagement with the lugs 24 of the adjacent blocker ring, which in turn is pushed in a direction axial of the assembly to engage the tapered friction clutch faces of the synchronizer with each other, in the manner shown at the left in Fig. 1.

Thus the force which is exerted by the transmission shift lever in shifting the collar out of neutral is utilized in a direct and positive manner not only to engage the synchronizer clutch members, but such direct force is also employed to operate the positive means for releasing the synchronizer blocker ring from its frictional engagement with the gear that is being coupled with or to the shaft 5.

When the shift collar 11 is in its intermediate or inactive neutral position, the blocker rings 12 and 13 are maintained with their teeth 18 and 19 respectively normally in blocking positions relative to the internal teeth 10 on the shift collar to prevent a forced or "crash" shift. This blocking relationship is maintained by suitable instrumentalities that are located circumferentially intermediate the blocker release levers 22 and comprise abutment lugs 33 that fit into recesses 34 in the shift collar 11 and the hub member 8. These abutment lugs are located preferably midway between the recesses 25 that accommodate the release lever mounting lugs 24. Elastic members, such as coiled springs 35 are interposed between the abutment lugs 33 and the adjacent transverse faces of the recesses 34. The ends of each spring are inserted into a seat 36 formed in the transverse face of the respective abutment lug 33 and press against the confronting transverse face 37 of the recess 34. Thus, when the shift collar is being moved toward the left (Fig. 1) the blocker ring 12 and gear 6 will become gradually engaged, and when the gear begins to rotate more slowly than the ring, the latter will rotate in an unblocking direction to permit the shift collar to mesh its teeth 10 with the blocker ring teeth that have become aligned therewith as the ring moves out of blocking position. The compression of the springs under these conditions during the shifting and aligning operation will allow the ring 12 to move out of its blocking position and the meshing of the teeth 10 and 18 will be readily consummated in a noiseless manner and without a "clashing" thereof.

Figs. 5 to 8 inclusive graphically illustrate the cycle of operating the blocker and release mechanism. Fig. 5 shows the relative positions of the parts when the assembly is at neutral, wherein the tapered or conical inner face 14 of blocker ring 12 is out of frictional contact with the tapered hub 16 on gear 6. In this position, internal teeth 10 on shift collar 11 are out of engagement with blocker ring teeth 18.

When shift collar 11 moves toward blocker 18 (Fig. 6) the blocker ring energizing means begins to operate by reason of the cam face 30 in collar teeth 10 moving the split spring 32 in the hub channel 31, thus forcing said spring against blocker ring lugs 24 and 33 thereby moving blocker ring 12 into frictional engagement with the cone face of gear hub 16. At this stage gear 6 begins to rotate at a speed approaching that of blocker ring 12 and the enlarged end 29 of lever 22 has moved radially outward on cam face 27 of gear 6 where it is in the path of the chamfered or undercut cam 28 on shift collar 11. Fig. 6 shows this position of the parts.

As the movement of shift collar 11 progresses to the position shown in Fig. 7, collar teeth 10 slide into blocker teeth 18 until meshed therewith and while doing so the collar cam 28, acting on the end of lever 22, exerts pressure radially inward thereon so that the end of lever 22 is then moved down or radially inward on gear cam 27 and a longitudinal force is exerted on said lever. Since lever 22 is fulcrumed on blocker ring 12, this longitudinal force on the lever is transmitted directly to blocker ring 12 so that said blocker ring is shifted away from gear 6 or axially of the assembly to effect a positive breakaway of blocker ring 12 from gear hub 16. During this breakaway the spring 32 has been pushed by the blocker ring toward the opposite side of channel 31 where it will remain until shift collar 11 is returned to neutral.

The shift collar, as shown in Fig. 8, continues its movement to the left until its teeth 10 have entered through the teeth 20 on gear 6. It will be seen that this backing off or breakaway of blocker ring 12 from gear 6 is approximately at the time of or preferably just prior to the meshing of shift collar teeth 10 with teeth 20 on gear 6.

Springs 35 function to maintain the blocking teeth 18 in blocking position until there is a reversal of torque, whereupon said springs are compressed and the blocking teeth are moved out of blocking position to permit collar teeth 10 to pass therethrough into engagement with gear teeth 20.

At the same time there is a breaking away of the blocker ring from the tapered hub of gear 6.

While this invention has been described in detail in its present preferred form or embodiment, it will be apparent to persons skilled in the art, after understanding the improvements contemplated herein, that various changes and modifications may be made therein without departing from the spirit and scope thereof. It is aimed in the appended claims to cover all such changes and modifications.

I claim:

1. A power transmitting coupling comprising a rotatable element; another element adapted for connection to the rotatable element; synchronizing means between said elements to prevent engagement thereof except upon substantial synchronization of said elements, said synchronizing means comprising an axially fixed friction member and a friction member movable axially into engagement with the fixed member, the fixed member being operable with one of the said coupling elements; a slidable clutch collar drivingly associated with the other of said elements and adapted to establish a positive connection between the elements; means operated by the collar prior to the establishment of the positive connection to operate the synchronizing means; and means also operated by the collar prior to the establishment of the positive connection but subsequent to the operation of the synchronizing means to transmit force applied to the collar directly to the movable friction member of the synchronizing means to force the movable friction member away from the fixed friction member.

2. A power transmitting coupling as defined in claim 1, wherein one of the friction members has means projecting into the path of movement of the collar to block engagement thereof.

3. A power transmitting coupling comprising a driving element, and a driven element adapted for connection thereto; friction means interposed between said elements adapted to synchronize the rotation of said elements; a positive clutch interposed between said elements, said positive clutch including a sliding clutch collar driven by said driving element and adapted to establish positive driving connection between said elements, said collar during its sliding movement adapted to operate said friction means to establish the aforesaid synchronized rotation of said elements prior to the establishment of said positive connection therebetween; and means actuated by said collar for transmitting force applied to said collar directly to the friction means to disconnect the latter prior to the operation of said positive clutch.

4. A power transmitting coupling comprising a rotatable shaft; a gear loose on said shaft adapted for connection thereto; a friction synchronizer interposed between said shaft and gear including cooperating axially fixed and axially movable members, the fixed member being carried by said gear; a slidable shift collar rotated by said shaft and adapted to engage the movable synchronizer member with said fixed member; cams on said gear and said collar; and means on the movable synchronizer member engaged by said cams for forcibly releasing the members of the synchronizer.

5. A power transmitting coupling as defined in claim 4, wherein the means for releasing the movable synchronizer member comprise levers fulcrumed on said movable member and disposed with their free ends in position to be contacted by said cams.

6. A power transmitting coupling comprising a rotatable shaft; a gear loose on said shaft adapted for connection thereto; a synchronizer interposed between said shaft and gear, said synchronizer including blocking means for preventing operation of the coupling until substantial synchronization of the parts thereof has been achieved, and a shift collar for energizing said blocking means to establish synchronization between said shaft and gear; and means for de-energizing said blocking means comprising oscillatory means carried by the blocking means; and cam means on said shift collar and said gear for moving said oscillatory means in a direction to disengage the blocker ring from the opposing clutch member.

7. A power transmitting coupling as defined in claim 6, wherein the oscillatory means comprise levers fulcrumed on the blocker ring, and the cam means comprise oblique annular faces on proximate portions of the shift collar and the gear.

8. A power transmitting coupling comprising a rotatable shaft; a gear loose on said shaft adapted for connection thereto; synchronizer means interposed between said shaft and gear, and including axially fixed and axially movable friction members, one member being carried by said gear and the other member being normally inactive; a shift collar rotatable with said shaft adapted to move the normally inactive member into frictional engagement with the member on said gear; cams on said gear and said collar; and means on said normally inactive member engaged with said cams when said collar has shifted a predetermined distance to effect a positive connection between the collar and the normally inactive member, the further movement of said collar adapted to operate said means to bodily move the clutch member out of engagement with its opposing member on the gear.

9. A power transmitting coupling as defined in claim 8, wherein the means on the normally inactive member comprise levers fulcrumed on said member and disposed with their movable portions in positions to be engaged by the cams on the gear and collar.

10. A power transmitting coupling comprising a rotatable shaft; spaced gears loose on said shaft adapted for selective connection thereto; a flanged hub fixed to said shaft and rotatable therewith between said gears; synchronizing friction clutches cooperating with the respective gears; a shift collar carried by said hub flange and rotatable therewith, said shift collar adapted to selectively actuate said clutches and effect connection between a gear and said shaft; means on the movable members of each clutch that are adapted to release each member from its opposing clutch member; and cams on said gears and the proximate portions of said collar adapted to engage the aforesaid means to effect release of the respective clutch member.

11. A power transmitting coupling as defined in claim 10, wherein the means on the movable clutch members comprise levers fulcrumed on said clutch members and disposed with their movable end portions between the respective cams on the collar and gear.

12. In a synchronizing coupling device, a toothed driving member; a toothed driven member aligned with the driving member; an internally splined collar slidable on one of said members adapted to connect the two members in driving relation; a toothed blocking means interposed between the driving and driven members; means for driving said blocking means from one of said members; a lost-motion connection between the blocking means and the said one member comprising a lug and recess; resilient means biasing the lug in one direction in its recess so as to position the blocking means to block the movement of the collar to engaged position; a cone friction clutch between the blocking means and the driving member whereby to synchronize rotation of the driving and driven members prior to the establishment of a positive connection therebetween by said collar; and cam means operated by said collar in its movement toward engaged position for forcibly and positively disconnecting the friction clutch.

13. A synchronizing coupling device as defined in claim 12, wherein the lug in the lost-motion connection is on the blocking means and the recess that cooperates with the lug is in the said one member, and the resilient means comprises a spring interposed between the lug and a wall of the recess and exerts its pressure circumferentially of the blocking means.

14. In a synchronizing coupling device, a toothed driving member; a toothed driven member aligned with the driving member; an internally splined collar slidable on the driven member adapted to connect the two members in driving relation; a toothed blocker ring on the driven member; means for driving said blocker ring from the driven member; a lost-motion connection between the blocker ring and the driven member comprising a recess in the driven member and a lug on said blocker ring projecting into said recess; a coiled spring interposed between the lug and a confronting wall of the recess for biasing the lug in one direction in its recess so as to position the blocker ring to block the movement of the collar to engaged position; a cone friction clutch between the blocker ring and the driving member whereby to synchronize rotation of the driving and driven members prior to the establishment of a positive connection therebetween by said collar; and cam means operated by said collar in its movement toward engaged position for forcibly and positively disconnecting the friction clutch.

15. In a synchronizing coupling device, a toothed driving member; a toothed driven member aligned with the driving member; an internally splined collar slidable on the driven member adapted to connect the two members in driving relation; a toothed blocker ring on the driven member; means for driving said blocker ring from the driven member; means for biasing the blocker ring in one direction of its movement so as to position the blocker ring to block the movement of the collar to engaged position; a cone friction clutch between the blocker ring and the driving member whereby to synchronize rotation of the driving and driven members prior to the establishment of a positive connection therebetween by said collar; levers each fulcrumed at one end on said blocker ring; and cams on said collar and said driving member for engaging the free ends of said levers during movement of said collar toward its engaged position for forcibly and positively disconnecting the friction clutch.

16. In a synchronizing coupling device, a toothed driving member; a toothed driven member aligned with the driving member; an internally splined collar slidable on one of said members and adapted to connect the two members in driving relation; a toothed blocking member located between the driving and driven members, said blocking member normally occupying an angular position in which it prevents movement of said collar to connect the driving and driven members but being movable to a second angular position to permit such connection; means for normally holding said blocking member in said first mentioned angular position; means on said driving member and said blocking member defining a friction clutch adapted to drivingly connect said members; means actuated by said collar for effecting clutch engagement to thereby move said blocking member to its unblocked position and synchronize rotation of the driving and driven members prior to the movement of said collar to establish a positive connection between the driving and driven members; and means driven by said collar in its movement to establish such a connection for positively moving said blocking member in an axial direction to disconnect said clutch and in so doing moving the blocking member to an axial position in which it may return freely to its normal blocking position when said collar is operated to disestablish the positive connection between the driving and driven members.

17. In a synchronizing coupling device, a toothed driving member; a toothed driven member aligned with the driving member; an internally splined collar slidable on one of said members and adapted to connect the two members in driving relation; a toothed blocking member located between the driving and driven members, said blocking member normally occupying an angular position in which it prevents movement of said collar to connect the driving and driven members but being movable to a second angular position to permit such connection; means for normally holding said blocking member in said first mentioned angular position; a friction clutch, one friction surface of said clutch being on said driving member and the cooperating friction surface being on said blocking member; means actuated by said collar for engaging said clutch to thereby move said blocking member to its unblocked position and synchronize rotation of the driving and driven members prior to the movement of said collar to establish a positive connection between the driving and driven members; and means driven by said collar in its movement to establish such a connection for positively moving said blocking member in an axial direction to disconnect said clutch and in so doing moving the blocking member to an axial position in which it may return freely to its normal blocking position when said collar is operated to disestablish the positive connection between the driving and driven members.

18. A power transmitting coupling comprising a rotatable driving member; a rotatable driven member coaxial to said driving member and adapted to be drivingly connected thereto; fixed and movable frictionally engageable means adapted to synchronize rotation of said driving and driven members; an axially shiftable collar adapted to effect engagement of said movable friction means with said fixed friction means; longitudinally arranged lever means fulcrumed on said movable friction means; and means defining a first cam and other means defining a second cam, said first cam being arranged to be effective during shifting of said collar to move a portion of said lever means into engagement with said second cam, and said second cam being arranged to be effective during further shifting of said collar to urge the said portion of the lever means against said first cam means to forcibly release said frictionally engageable synchronizing means.

19. A power transmitting coupling as defined in claim 18 wherein the first and second cams are spaced axially apart and one of said cams is adapted to be bodily moved toward the other cam during the shifting of the collar.

20. A power transmitting coupling comprising a rotatable driving gear; a rotatable driven member coaxial to said driving gear and adapted to be drivingly connected thereto; means on said driving gear and said driven member defining a friction clutch adapted to synchronize rotation of said gear and member; an axially shiftable collar adapted to effect engagement of said friction clutch; longitudinally arranged lever means fulcrumed on the movable member of said friction clutch; means defining a first cam; and means defining a second cam, said first cam being arranged to be effective during shifting of said collar to move a portion of said lever means into engagement with said second cam, and said second cam being arranged to be effective during further shifting of said collar to urge the said portion of the lever means against said first cam means to forcibly release said friction clutch.

21. A power transmitting coupling comprising a rotatable driving gear; a rotatable driven member coaxial to said driving gear and adapted to be drivingly connected thereto; a clutch assembly including a friction surface rotatable with said driving gear, and a movable friction member rotatable with said driven member, said clutch assembly being adapted to synchronize rotation of said driving gear and driven member; an axially shiftable collar cooperating with said movable clutch friction member and adapted to effect engagement of said friction clutch; longitudinally arranged lever means fulcrumed on said movable clutch member; means defining a first cam associated with said driving gear; and means on said collar defining a second cam, said first cam being arranged to be effective during shifting of said collar to move a portion of said lever means into engagement with said second cam, and said second cam being arranged to be effective during further shifting of said collar to urge the said portion of the lever means against said first cam means to forcibly release said clutch.

22. A power transmitting coupling comprising driving and driven members; a positive clutch member adapted for axial movement to effect connection of said driving and driven members; a friction clutch member adapted for axial movement to effect synchronized driving relation between said driving and driven members prior to connection of said members by said positive clutch member; and means adapted to release said friction clutch member subsequent to initial engagement of said driving and driven members, said means comprising lever members fulcrumed on said friction clutch member, and cam means carried by said driving member and driven member for operating said lever members to bodily retract said friction clutch member thereby to effect the aforesaid release thereof.

23. A power transmitting coupling comprising driving and driven members; a positive clutch member adapted for axial movement to effect connection of said driving and driven members; a friction clutch member adapted for axial movement to effect synchronized driving relation between said driving and driven members prior to connection of said members by said positive clutch member; lever members fulcrumed on said friction clutch member; and spaced cam means carried respectively by said driving and driven members, one of said cam means being arranged to be moved bodily towards the other cam means whereby to act on said lever members to produce a positive force thereon to release said friction clutch member.

JOHN B. POLOMSKI.

REFERENCES CITED

The following references are of record in the file of this patent:

UNITED STATES PATENTS

| Number | Name | Date |
| --- | --- | --- |
| 2,152,552 | Lindstrom | Mar. 28, 1939 |
| 1,931,288 | Griswold | Oct. 17, 1933 |
| 1,901,712 | Christman | Mar. 14, 1933 |